Figure 1:
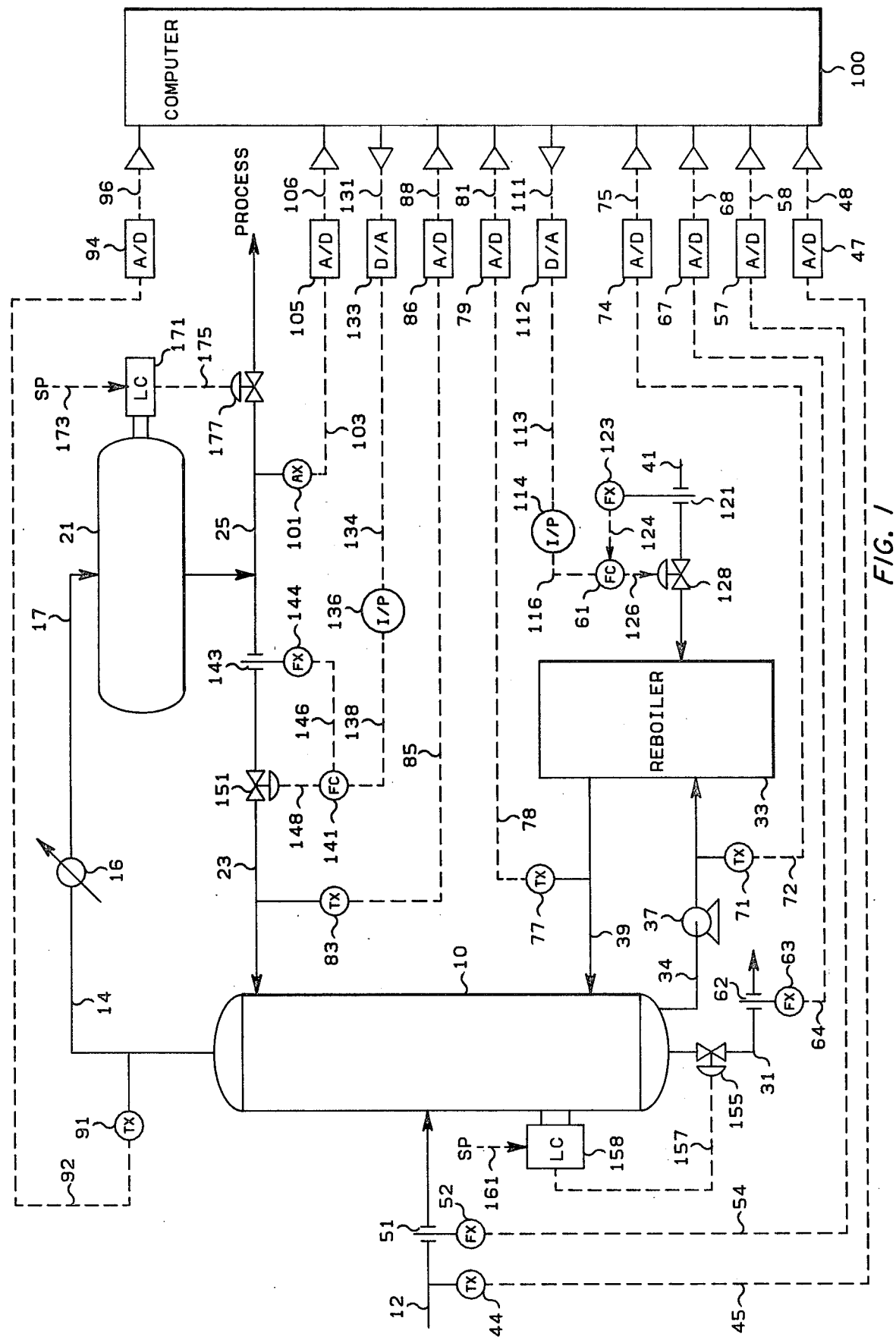

United States Patent [19]

Anderson et al.

[11] 4,166,770
[45] Sep. 4, 1979

[54] FRACTIONATION CONTROL

[75] Inventors: John E. Anderson; Gary L. Funk, both of Bartlesville, Okla.

[73] Assignee: Phillips Petroleum Company, Bartlesville, Okla.

[21] Appl. No.: 908,418

[22] Filed: May 22, 1978

[51] Int. Cl.² ............................ B01D 3/42; G06G 7/58
[52] U.S. Cl. ........................................ 203/2; 202/160; 364/501
[58] Field of Search .............. 23/230 A; 422/62, 105, 422/108; 203/1, 2; 364/501; 202/160

[56] References Cited

U.S. PATENT DOCUMENTS

| 2,595,948 | 5/1952 | Jones et al. | 202/40 |
|---|---|---|---|
| 3,294,648 | 12/1966 | Lupfer et al. | 203/2 |
| 3,365,386 | 1/1968 | Van Pool | 208/41 |
| 3,463,725 | 8/1969 | MacFarlane et al. | 203/2 |
| 3,793,157 | 2/1974 | Hobbs et al. | 203/2 |
| 3,905,873 | 9/1975 | Wright et al. | 203/2 |
| 4,096,574 | 6/1978 | Christie | 203/2 |

Primary Examiner—R. E. Serwin

[57] ABSTRACT

A control system for a fractionation column which separates a feed into a heavy bottoms product, which is used as fuel for a plant, and into a light overhead product, which is used in a process, is disclosed. The fractionation column is controlled in such a manner that sufficient bottoms product is supplied to meet the plant fuel requirements while maintaining a desired distillation temperature for the overhead product. The flow rate of fuel oil to the reboiler furnace associated with the fractionation column and the flow rate of the external reflux to the fractionation column are controlled in such a manner that the objectives of supplying sufficient bottoms product to meet plant fuel requirements and supplying an overhead product having a desired distillation temperature are met while still minimizing the external reflux flow rate and the flow rate of the fuel oil to the reboiler furnace to increase fuel economy.

28 Claims, 2 Drawing Figures

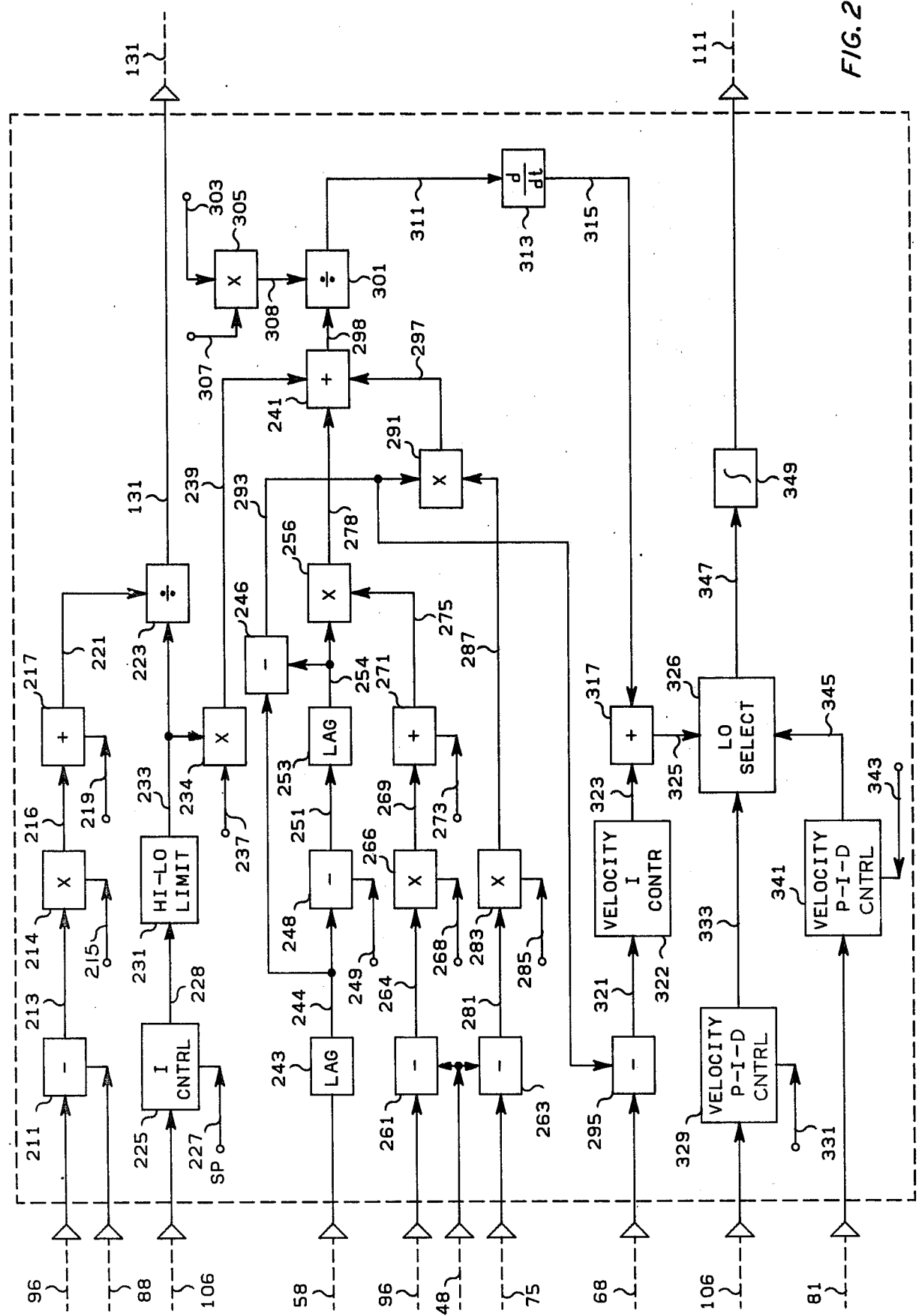

FRACTIONATION CONTROL

This invention relates to control of a fractionation column. In a particular aspect this invention relates to method and apparatus for maintaining a desired ratio of bottoms product flow rate to feed flow rate while maintaining a desired distillation temperature for the overhead product from the fractionation column. In another particular aspect this invention relates to method and apparatus for maintaining a desired ratio of long term average bottoms product flow rate to feed flow rate while maintaining a desired distillation temperature for the overhead product from the fractionation column and smoothing the rate of change (reducing flow transients) in the overhead product flow rate caused by changes in the feed rate. In still another particular aspect this invention relates to method and apparatus for increasing the energy efficiency of a fractionation column while still providing sufficient bottoms product to meet the fuel requirements of a plant and maintaining a desired distillation temperature for the overhead product from the fractionation column.

Government regulations and increasing natural gas shortages have forced increased use of fuel oil in manufacturing and processing plants. In many plants where light hydrocarbons are processed, the chapest way to obtain fuel oil is to fractionate a feed stream containing light and heavy hydrocarbons. The light hydrocarbons are utilized to supply the required feed to another process or may be a product of the separation process. The heavy hydrocarbons are utilized as fuel oil for several plant heating uses.

Generally, two criteria must be met in manufacturing processes where the light hydrocarbons from the fractionation process are used in another process operation and the heavy hydrocarbons are used as fuel for the entire plant. One criterion is that sufficient heavy hydrocarbons or bottoms product must be produced to supply the fuel requirements of the plant. The fuel requirement of a combination process step is generally a function of the flow rate of the feed to the plant and thus it is desirable to maintain a relatively constant heavy hydrocarbon (bottoms product) flow rate to feed flow rate ratio to insure that sufficient bottoms product is available to supply fuel to the plant.

The second criterion involves the concentration of heavy organic compounds, principally hydrocarbons, which are supplied to the downstream process step. In decomposition processes such as cracking, gasification et al where light hydrocarbons are being processed, heavier hydrocarbons have an increased tendency to deactivate catalysts in the reactors and to cause coke buildup especially in tubular thermal reactors. Because of these effects, the concentration of heavy hydrocarbons contained in the overhead product from the fractionator as feed to such a process must be closely controlled. The concentration of heavy hydrocarbons in the overhead product from the fractionation process can be determined from a suitably selected temperature measured during an automated analytical distillation performed on successive batch samples of overhead product. It is thus a requirement that this distillation temperature of the overhead samples be controlled at some maximum level to prevent the inclusion of excessive concentration of heavy hydrocarbons in the downstream process feed which would cause catalyst deactivation and/or the buildup of coke in reactor zones.

It is also desirable to operate the fractionation column so as to increase the energy efficiency of the fractionation column while still meeting the two criteria set forth in the preceding paragraphs. Generally increasing of the energy efficiency of a fractionation column is accomplished by controlling the rate of heat input to the reboiler associated with the fractionation column and by controlling the flow rate of external reflux to the fractionation column. It is thus desirable to maintain control over these parameters if such control does not interfere with the meeting of the two criteria set forth in the preceding paragraphs.

Where the overhead product from a fractionation column is being supplied to a downstream process, it is desirable to prevent rapid fluctuations in the flow rate of the overhead product to the process. Fluctuations in the feed rate to the fractionation column must ultimately affect either the flow rate of the overhead product or the flow rate of the bottoms product or both. With the instant process system, it is desirable to allow the more rapid changes to occur in the bottoms product flow rate while suppressing large changes in the overhead product flow rate in response to changes in the feed rate to the fractionation column because the bottoms product is frequently supplied to a holding tank before being used as fuel. The holding tank functions to smooth out the rapid changes in the flow rate of the bottoms product so that rapid fluctuations in the bottoms product flow rate has little disturbing effect as long as the long term average bottoms product flow rate to feed flow rate ratio is held constant.

It is thus an object of this invention to provide method and apparatus for maintaining a desired bottoms product flow rate to feed flow rate ratio while maintaining a desired distillation temperature for the overhead product stream from the fractionation column. Another object of this invention is to provide method and apparatus for maintaining a desired long term average bottoms product flow rate to feed flow rate ratio while maintaining a desired distillation temperature for the overhead product from the fractionation column and smoothing the rate of change in the overhead product flow rate caused by change in the feed rate. Still another object of this invention is to provide method and apparatus for increasing the energy efficiency of a fractionation column while still providing sufficient bottoms product to meet the fuel requirements of a plant and maintaining a desired distillation temperature for the overhead product stream from the fractionation column.

In accordance with the present invention, a plurality of process parameters are measured and provided as inputs to a computer means. In response to the measured system parameters and desired set point inputs provided to the computer means, the computer means generates a pair of control signals which are calculated to maintain a desired bottoms product flow rate while also maintaining a desired composition of the overhead product.

One control signal provided by the computer means is representative of the required flow rate of the fuel flowing to the fired reboiler associated with the fractionation column. The flow rate of the fuel oil to the reboiler furnace is controlled in response to this control signal so as to provide a desired heat input to the fractionation column. Since the concentration of heavy hydrocarbons in the overhead product and the proportion of bottoms product produced are functions of the energy exchange in the fractionation column, control of the flow rate of the fuel oil to the fired reboiler associated with the fractionation column can be utilized to control the bottoms product flow rate and the composition of the overhead product.

The second parameter controlled by the computer means is the flow rate of the external reflux to the fractionation column. The flow rate of the external reflux is also determinative of the composition of the overhead product as well as the proportion of bottoms product produced. The external reflux flow rate is controlled so as to provide only sufficient external reflux to maintain a desired composition of the overhead product while still maintaining a required bottoms product flow rate.

Both the flow rate of the fuel oil to the reboiler associated with the fractionation column and the flow rate of the external reflux to the fractionation column are controlled so as to increase the energy efficiency of the fractionation column. This is accomplished by holding both the flow rate of the external reflux and the flow rate of the fuel oil to the fired reboiler as low as possible while still maintaining a desired composition of the overhead product and a required flow rate of the bottoms product.

Other objects and advantages of the invention will be apparent from the detailed description of the invention and the appended claims as well as from the detailed description of the drawings in which:

FIG. 1 is an illustration of a fractionation column and the associated control system for the fractionation column; and FIG. 2 is a flow diagram of the computer logic required to generate the control signals utilized to control the fractionation column illustrated in FIG. 1.

The invention is illustrated and described in terms of a synthetic natural gas plant wherein heavy hydrocarbons from a feed to the synthetic natural gas plant are utilized as fuel for the plant and light hydrocarbons from the feed are utilized to manufacture a fuel gas. The invention, however, is applicable to other manufacturing processes where it is desirable to use the light hydrocarbons from a feed to supply a downstream process and use the heavy hydrocarbons from the feed to supply fuel to several processes.

Although the invention is illustrated and described in terms of a specific fractionation column and a specific control system for the fractionation column, the invention is also applicable to different types and configurations of fractionation columns as well as different types of control system configurations which accomplish the purpose of the invention. Lines designated as signal lines in the drawings are electrical in this preferred embodiment. However, the invention is also applicable to pneumatic, mechanical, hydraulic or other signal means for transmitting information. In almost all control systems some combination of these types of signals will be used. However, use of any other type of signal transmission, compatible with the process and equipment in use is within the scope of the invention.

A digital computer is used in the preferred embodiment of this invention to calculate the required control signals based on measured process parameters as well as set points supplied to the computer. Analog computers or other types of computing devices could also be used in the invention.

Controllers shown may utilize the various modes of control such as proportional, proportional-integral, proportional-derivative, or proportional-integral-derivative. In this preferred embodiment proportional-integral controllers are utilized. The operation of these types of controllers is well known in the art. The output control signal of a proportional-integral controller may be represented as $$S = K_1 E + K_2 \int E \, dt$$

where
  S = output control signal;
  E = difference between two input signals; and
  $K_1$ and $K_2$ are constants.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more of such equipment types. While the presently preferred embodiment of the invention preferably utilizes a combination of pneumatic control elements such as a pneumatically operated valve means 61 in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. In addition, all signals could be translated into a "suppressed zero" or other similar format in order to provide a "live zero" and prevent an equipment failure from being erroneously interpreted as a "low" or "high" measurement or control signal. Regardless of the signal format or the exact relatonship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to the drawings and in particular to FIG. 1, a fractionation column 10 is illustrated. A feed containing light and heavy hydrocarbons is supplied to the fractionation column 10 through conduit means 12. An overhead vapor stream is removed from the fractionation column through conduit means 14. The overhead vapor stream is condensed and cooled in heat exchanger means 16 and is then supplied through conduit means 17 to the overhead tank 21. The condensed overhead liquid is supplied from the overhead tank as both external reflux to the fractionation column 10 through conduit means 23 and as an overhead product to a synthetic natural gas reactor (not illustrated) through conduit means 25.

A bottoms product is removed from the fractionation column 10 through conduit means 31. Bottoms liquid is also circulated through the fuel oil-fired reboiler 33 by conduit means 34 and 39 for at-least-partial generation of reboiling vapor therein. The flow rate of the bottoms liquid to the reboiler 33 is held constant by pumping means 37 and/or conventional control not shown. The heated, at-least-partially-vaporized, bottoms circulation is supplied from the reboiler 33 to the fractionation column 10 through conduit means 39. The heated bottom circulation supplies heat to accomplish the fractionation process. Fuel oil is supplied to the reboiler 33 through conduit means 41 and is combusted therein.

The fractionation system described to this point is a conventional fractionation system. It is the manner in which the fractionation system illustrated in FIG. 1, is controlled so as to maintain a desired bottoms product flow rate and a desired overhead product composition which provides the novel features of the present invention.

Control of the fractionation system illustrated in FIG. 1 is generally accomplished by measuring a plurality of system parameters and supplying the measured parameters to computer means 100. Computer means 100 is a Fox 1 digital computer provided by the Foxboro Company, Foxboro, Mass. Computer means 100 is also supplied with a plurality of set point signals which are representative of desired operating characteristics for the fractionation system illustrated in FIG. 1. In response to the measured inputs and the set point inputs, computer means 100 calculates the flow rate of the fuel oil to be combusted in the fired reboiler 33, and the flow rate of the external reflux to the fractionation column 10 required to maintain a desired bottoms product flow rate and also maintains a desired overhead product composition.

Temperature transducer 44 supplies a signal 45 representative of the measured temperature of the feed flowing through conduit means 12 to the analog to digital (A/D) converter 47. The A/D converter 47 converts signal 45 to digital form and supplies a signal 48, representative of the temperature of the feed flowing through conduit means 12, to computer means 100. Flow sensor 51 provides a measurement of the flow rate of the feed flowing through the conduit means 12 to flow transducer 52. Flow transducer 52 provides a signal 54, representative of the flow rate of the feed flowing through conduit means 12 to the A/D converter 57. The A/D converter 57 converts signal 54 to digital form and supplies a signal 58, representative of the measured flow rate of the feed flowing through conduit means 12 to computer means 100. Flow sensor 62 provides a measurement of the flow rate of the bottoms product flowing through conduit means 31 to the flow transducer 63. The flow transducer 63 provides a signal 64, representative of the measured flow rate of the bottoms product flowing through conduit means 31 to the A/D converter 67. The A/D converter 67 converts signal 64 to digital form and provides a signal 68, representative of the measured flow rate of the bottoms product flowing through conduit means 31, to computer means 100. Temperature transducer 71 provides a signal 72, representative of the temperature of the bottoms liquid flowing through conduit means 34 to the A/D converter 74.

The A/D converter 74 converts signal 72 to digital form and provides a signal 75, representative of the measured temperature of the bottoms liquid flowing through conduit means 34, to computer means 100. Temperature transducer 77 provides a signal 78, representative of the measured temperature of the at-least-partially vaporized bottoms liquid flowing from the reboiler 33 to the fractionation column 10 through conduit means 39, to the A/D converter 79. The A/D converter 79 converts signal 78 to digital form and provides a signal 81, representative of the measured temperature of the bottoms liquid and vapor flowing through conduit means 39 to the computer means 100. Temperature transducer 83 provides a signal 85 representative of the temperature of the external reflux flowing through conduit means 23 to the A/D converter 86. The A/D converter 86 converts signal 85 to digital form and provides a signal 88 representative of the measured flow rate of the external reflux flowing through conduit means 23 to the computer means 100. Temperature transducer 91 provides a signal 92 representative to the temperature of the overhead vapor leaving the fractionation column 10 through conduit means 14, to the A/D converter 94. The A/D converter 94 converts signal 92 to digital form and provides a signal 96 representative of the temperature of the overhead vapor flowing through conduit means 14 to the computer means 100.

Analyzer transducer 101 is a distillation temperature analyzer such as is available from Hallikainen Associates, San Rafael, Calif. Such analyzers are known in the control art and are commonly utilized in successive batch analysis manner to measure, at a predetermined point in the analytical distillation, a temperature which is related to the concentration of heavy hydrocarbons in the samples of overhead product. In the preferred embodiment of this invention, the analyzer 101 provides a signal 103, representative of the temperature at which 95 percent of a sample of the overhead product flowing through conduit means 25 is distilled. The analyzer transducer 101 samples the overhead product flowing through conduit means 25 and then heats the sample to perform an automated ASTM distillation. Signal 103 is thus representative of the still vapor temperature at which 95 percent of the overhead product sample has been distilled. Signal 103 may be referred to as the distillation "end point" temperature and those familiar with petroleum laboratory procedures will recognize the relationship of the various percentage-distilled, dry or end point temperatures to the composition of the overhead product. Signal 103 is supplied from analyzer transducer 101 to the A/D converter 105. The A/D converter 105 converts signal 103 to digital form and provides a signal 106 representative of the distillation temperature of the overhead product to the computer means 100.

In response to the described inputs, computer means 100 calculates two control signals which are utilized in controlling the fractionation process illustrated in FIG. 1. One control signal, calculated by the computer means 100, is the required flow rate of the fuel oil flowing through conduit means 41. Signal 111, representative of the required flow rate of the fuel oil flowing through conduit means 41 is supplied from the computer means 100 to the digital to analog (D/A) converter 112. The D/A converter 112 converts signal 111 to analog form and supplies a signal 113 representative of the required flow rate of the fuel oil flowing through conduit means 41 to the current-to-pressure transducer 114. The current pressure transducer 114 converts signal 111 to an equivalent pneumatic pressure signal 116 and supplies signal 116 as the set point to the flow controller 61. Flow sensor 121 provides a measurement of the actual flow rate of the fuel oil flowing through conduit means 41 to flow transducer 123. Flow transducer 123 provides a signal 124, representative of the measured flow rate of the fuel oil flowing through conduit means 41 to the flow controller 61. In response to signals 116 and 124 the flow controller 61 provides an output signal 126 which is responsive to the difference between signals 116 and 124. Signal 126 is provided to actuate the pneumatic control valve 128 which is located in conduit means 41. The pneumatic control valve 128 is thus manipulated in response to signal 126 to thereby maintain the flow rate of the fuel oil flowing through conduit means 41 at a desired level.

The second control signal from computer means 100 is representative of the required flow rate of the external reflux to the fractionation column 10. Signal 131, representative of the required flow rate of the external reflux to the fractionation column 10 is supplied from computer means 100 to the D/A converter 133. The D/A converter 133 converts signal 131 to analog form and provides a signal 134 representative of the required flow rate of the external reflux to the fractionation column 10 to the current-to-pressure transducer 136. The current-to-pressure transducer 136 converts signal 134 to an equivalent pressure signal 138 and supplies signal 138 as the set point to the flow controller 141. Flow sensor 143 provides a measurement of the flow rate of the external reflux, flowing through conduit means 23 to the fractionation column 10, to the flow transducer 144. Flow transducer 144 provides a signal 146 representative of the measured flow rate of the external reflux flowing through conduit means 23 to the flow controller 141. In response to signals 138 and 146 the flow controller 141 provides an output signal 148, responsive to the difference between signals 138 and 146, to actuate the pneumatic control valve 151 which is operably located in conduit means 23. The pneumatic control valve 151 is thus manipulated in response to signal 148 to thereby maintain the flow rate of the external reflux through conduit means 23 to the fractionation column 10 at a desired level.

The flow rate of the bottoms product through conduit means 31 is controlled by means of pneumatic control valve 155. Pneumatic control valve 155 is manipulated in response to signal 157 which is the output from the level controller 158. Signal 157 is generated by the level controller 158 in response to a measurement of the actual level of the bottoms liquid in the fractionation column 10 and the set point 161, representative of the desired level of the bottoms product in the fractionation column 10, which is supplied to the level controller 158. The pneumatic control valve 155 is thus manipulated in response to signal 157 to thereby maintain the level of the bottoms product in the fractionation column 10 at a desired level. The heat input to the fractionation column, via combustion of fuel oil in fired reboiler 33, which is determined by signal 111; and the flow rate of the external reflux to the fractionation column, which is determined by signal 131, are thus controlled so as to supply a required long term average flow rate of bottoms product to meet the fuel requirements of the plant via the indirect, rapid action of level controller 158.

The level of the overhead product (distillate) in the overhead tank 21 is maintained by means of level controller 171. Level controller 171 measures the actual liquid level in the overhead tank 21 and is also supplied with a set point 173, which is representative of the desired liquid level in the overhead tank 21. In response to the set point signal 173 and the measurement of the liquid level in the overhead tank 21, the level controller 171 provides a signal 175 to actuate the pneumatic control valve 177 operably located in conduit means 25. Signal 175, which is responsive to the difference between the set point signal 173 and the measurement of the actual liquid level in the overhead tank 21, is utilized to manipulate pneumatic control valve 177 so as to maintain a desired liquid level in the overhead tank 21. The flow rate of the external reflux to the fractionation column 10, which is determined by signal 131, and the flow rate of fuel oil to the reboiler 33, which is determined by signal 111, are thus controlled so as to maintain sufficient overhead product flowing through conduit means 17 so that the liquid level in the overhead tank 21 can be maintained at a desired level while still supplying sufficient external reflux to the fractionation column 10 for the purpose of separation and supplying an overhead product having a desired composition to a synthetic natural gas process through conduit means 25.

The following development of the control signals 111 and 131, illustrated in FIG. 1, is provided to clarify the logic flow diagram illustrated in FIG. 2. The required flow rate of fuel oil to the reboiler 33, illustrated in FIG. 1, is a function of the heat required by the fractionation process. The heat required by the fractionation process is the sum of three terms:

(A) heat required to vaporize the reflux;
(B) heat required to raise the temperature of the feed to the bottom product temperature; and
(C) heat required to vaporize the portion of the feed which forms the overhead vapor stream.

The heat required to vaporize the reflux is given by $$Q_1 = (R_I)(H_{VR}) \qquad (I)$$

where:

$Q_1$ = heat required to vaporize the reflux;
$R_I$ = flow rate of the internal reflux where the internal reflux is defined as the reflux liquid flowing downwardly inside the fractionation column 10, illustrated in FIG. 1; and
$H_{VR}$ = heat of vaporization of the internal reflux.

The heat required to raise the portion of the feed which forms the bottoms product, from the feed temperature to the bottom product temperature is given by:

$$Q_2 = (B)(C_{PB})(T_B - T_F) \qquad (II)$$

where:

$Q_2$ = heat required to raise the temperature of the bottoms portion of the feed to the bottom product temperature;
B = flow rate of the bottom product;
$C_{PB}$ = specific heat of the portion of the feed which forms the bottom product;
$T_B$ = temperature of the bottom product; and
$T_F$ = temperature of the feed.

The heat required to vaporize the portion of the feed which forms the overhead product is given by:

$$Q_3 = DH_{VD} + C_{PD}(T_T - T_F) \qquad (III)$$

where:

$Q_3$ = heat required to vaporize the portion of the feed which forms the overhead vapor stream;
$D$ = flow rate of the overhead vapor stream;
$H_{VD}$ = heat of vaporization of the portion of the feed which forms the overhead vapor stream;
$C_{PD}$ = specific heat of the portion of the feed which forms the overhead vapor stream;
$T_T$ = temperature of the overhead vapor stream; and
$T_F$ = temperature of the feed.

Combining Equations (I), (II), and (III) gives the total heat required by the fraction process as $$Q = (R_I)(H_{VR}) + (B)(C_{PB})(T_B - T_F) + (D)[H_{VD} + C_{PD}(T_T - T_F)] \quad (IV)$$

where Q is the total heat required by the fractionation process and all other variables are as previously defined.

The flow rate of the external reflux to the fractionation column 10 is given by the well known equation $$R_E = \frac{R_I}{1 + (K)(T_T - T_R)} \quad (V)$$

where:

$R_E$ = flow rate of external reflux;
$R_I$ = flow rate of internal reflux, where the internal reflux is defined as the reflux flowing inside the fractionation column 10;
$K$ = specific heat of the external reflux divided by the heat of vaporization of the external reflux;
$T_T$ = temperature of overhead vapor stream; and
$T_R$ = temperature of the external reflux.

The logic flow diagram utilized to calculate the control signals 111 and 131 in response to the previously described input signals to the computer means 100 is illustrated in FIG. 2. Symbols previously described and defined in the development of Equations (IV) and (V) are utilized in the description of FIG. 2. Referring now to FIG. 2, computer means 100 is shown as a dotted line surrounding the flow logic. Signal 96, representative of $T_T$, is supplied as a first input to the subtracting block 211. Signal 88, representative of $T_R$, is supplied as a second input to the subtracting block 211. The value of $T_R$, is subtracted from the value of $T_T$ to provide a signal 213, which is representative of $(T_T - T_R)$. The differential temperature represented by signal 213 is supplied as a first input to the multiplying block 214. The multiplying block 214 is also supplied with a signal 215, representative of the constant K. The output signal 216 from the multiplying block 214 is thus representative of $(K)(T_T - T_R)$. Signal 216 is supplied as a first input to the summing block 217. The summing block 217 is also supplied with a signal 219, representative of the constant +1. Signal 221, supplied from the summing block 217, is thus representative of $1 + (K)(T_T - T_R)$. Signal 221 is supplied as a first input to the dividing block 223.

Signal 106, representative of the measured distillation temperature of the overhead product samples $T_{EP}$ is supplied as a first input to the integral controller block 225. The integral controller block 225 is also supplied with a set point signal 227, representative of the desired distillation temperature for the overhead product. Signal 228, which is output from the integral controller block 225, is representative of a prediction of the flow rate of the internal reflux $R_I$ required to hold signal 106 equal to signal 227. Signal 228 is provided a high-low limit block 231, the function of which is to prevent an equipment malfunction from providing too much or too little external reflux to the fractionation column. The signal 233 from the high-low limit block 231 is thus representative of a predicted required internal reflux flow rate $R_I$. Signal 233 is provided as a first input to the multiplying block 234 and is also supplied as a second input to the dividing block 223. Signal 233 is divided by signal 221 in the dividing block 223 to thereby produce a signal 131, representative of the estimated required flow rate of the external reflux $R_E$. Signal 131 is provided as an output from computer means 100 and is utilized as has been previously described.

A signal 237, representative of the heat of vaporization of the internal reflux ($H_{VR}$), is supplied as a second input to the multiplying means 234. The output signal 239 from the multiplying block 234 is representative of $(R_I)(H_{VR})$ or is representative of $Q_1$, as defined by Equation (I). Signal 239, representative of $Q_1$, is supplied as a first input to the summing block 241.

Signal 58, representative of the flow rate of the feed to the fractionation column (F), is supplied as an input to the lag block 243. The lag block 243 is provided to account for the time delay required for the propagation of the feed to either the top or bottom of the fractionation column. Signal 244 is thus representative of F delayed by the actions of one or several time constants and/or dead times as required for specific systems. Signal 244 is supplied as a first input to the subtracting block 246 and is also supplied as a first input to the subtracting block 248. The signal 249, which is representative of the desired bottoms product flow rate through conduit means 31, illustrated in FIG. 1, is provided as a second input to the subtracting block 248. Signal 249 is subtracted from signal 244 in the subtracting block 248 to provide a signal 251 which is representative of the predicted flow rate of the overhead vapor stream (D). Signal 251 is supplied to the lag block 253 which is provided to smooth the response of the overhead vapor stream to a change in the flow rate of the feed. Signal 254 which is supplied from the lag block 253 is thus representative of the delayed, predicted flow rate of the overhead vapor stream. Signal 254 is supplied as a first input to the multiplying block 256 and is also supplied as a second input to the subtracting block 246.

Signal 96, which is representative of $T_T$, is also supplied as a first input to the subtracting block 261. Signal 48, which is representative of $T_F$, is supplied as a second input to the subtracting block 261 and is also supplied as a first input to the subtracting block 263. Signal 264, which is representative of $(T_T - T_F)$ is supplied as a first input to the multiplying block 266. The signal 268, representative of the constant $C_{PD}$, is supplied as a second input to the multiplying block 266. The output signal 269, representative of $(C_{PD})(T_T - T_F)$ is supplied as a first input to the summing block 271 from the multiplying block 266. The signal 273, representative of the constant $H_{VD}$, is supplied as a second input to the summing block 271. The signal 275, representative of $H_{VD} + (C_{PD})(T_T - T_F)$ is supplied as a second input to the multiplying block 256 from the summing block 271. Signal 278, which is representative of $Q_3$, as defined in Equation (III), is provided as a second input to the summing block 241 from the multiplying block 256.

Signal 75, representative of $T_B$, is supplied as a second input to the subtracting block 263. The signal 281, representative of $T_F-T_B$ is supplied as a first input to the multiplying block 283 from the subtracting block 263. The signal 285, representative of the constant $C_{PB}$, is supplied as a second input to the multiplying block 283. Signal 287, representative of $(C_{PB})(T_B-T_F)$, is supplied as a first input to the multiplying block 291 from the multiplying block 283. Signal 293, representative of the predicted flow rate of the bottoms product (B) is supplied as a second input to the multiplying block 291 from the subtracting block 246. Signal 293 is also supplied as a first input to the subtracting block 295. Signal 297, representative of $Q_2$, as defined in Equation (II), is supplied as a third input to the summing block 241. Signal 298, representative of the total heat required by the fractionation column (Q) as defined in Equation (IV) is provided as a first input to the dividing block 301 from the summing block 241.

The signal 303, representative of the measured or calculated heat of combustion of the fuel oil being supplied to the reboiler 33 illustrated in FIG. 1, is supplied as a first input to the multiplying block 305. The signal 307, representative of the measured or calculated efficiency with which the fuel oil can be converted to fractionation column heat input, is supplied as a second input to the multiplying block 305. Signal 308, representative of the heat of combustion of the fuel oil multiplied by the efficiency of the combustion of the fuel oil, is supplied as a second input to the dividing means 301 from the multiplying block 305. Signal 298 is divided by signal 308 in the dividing block 301 to provide an output signal 311, representative of the required flow rate of the fuel oil to the reboiler. Signal 311 is provided as an input to the derivative block 313 which provides an output signal 315, representative of the derivative of the required flow rate of the fuel oil. Signal 315 is supplied as a first input to the summing block 317.

Signal 68, representative of the actual measured flow rate of the bottoms product flowing through conduit means 31 ($B_M$) is provided a second input to the subtracting block 295. Signal 321, representative of the difference between the predicted bottoms product flow rate represented by signal 293 and the actual measured bottoms product flow rate represented by signal 68 is provided as an input to the velocity integral controller block 322. The velocity integral controller block 322 may be thought of mathematically in terms of a block which takes the derivative of the output of an integral controller. The output signal 323 from the velocity integral controller block 322 is representative of the change in the required predicted flow rate of the fuel oil to the reboiler, as represented by signal 315, which is required to force the predicted bottoms product flow rate, represented by signal 293, to equal the measured bottoms flow rate, represented by signal 68. Signal 323 is provided as a second input to the summing block 317 from the velocity integral controller block 322. Signal 325, representative of the derivative of the corrected required flow rate of the fuel oil is supplied as a first input to the low select block 326.

Signal 106, representative of $T_{EP}$ is supplied as a first input to the velocity proportional-integral-derivative controller block 329. The set point signal 331, representative of the maximum allowable end point temperature ($T_{EP}$), is provided as the second input to the velocity proportional-integral-derivative controller block 329. Signal 333, representative of the derivative of the maximum allowable flow rate of the fuel oil which will maintain $T_{EP}$ at or below the set point signal 331, is provided as a second input to the low select block 326 from the velocity proportional-integral-derivative controller 329.

Signal 81, representative of the temperature of the fluid flowing from the reboiler 33 through conduit means 39 ($T_{HT}$), is supplied as a first input to the velocity proportional-integral-derivative controller block 341. The set point signal 343, representative of the maximum allowable temperature of the fluid flowing from the reboiler 33 through conduit means 39, is provided as a second input to the velocity proportional-integral-derivative controller block 341. The output signal 345, representative of the derivative of the maximum allowable flow rate of the fuel oil which will maintain $T_{HT}$ at or below the set point signal 343 is provided as a third input to the low select block 336. The output signal 347, which is representative of the derivative of the required flow rate of the fuel oil, is supplied as an input to the integrator block 349. The output signal 111 from the integrator 349 is representative of the required flow rate of the fuel oil. The output signal 111 is utilized as has been previously described in FIG. 1.

The velocity algorithms are used for the velocity integral controller 322, the velocity proportional-integral-derivative controller 329, and the velocity proportional-integral-derivative controller 341 to prevent reset windup (repetitive integration in a controller whose output is not being used via low select 326). Reset windup refers to the fact that only one of the controllers 322, 329 or 341 will be supplying the signal which is passed by the low select 326 for control use. If velocity algorithms are not used, the controllers which are not selected will continue to integrate the error, and this undesired characteristic is referred to as reset windup. To prevent this continued integration velocity algorithms are utilized.

The output from the velocity proportional-integral-derivative controller 329 and the output from the velocity proportional-integral-derivative controller 341 are utilized as protection features. The output signal 333 from the velocity proportional-integral-derivative controller 329 prevents an excessive fuel oil flow rate, which would drive the end point temperature of the overhead product too high, from being selected. The output signal 345 from the velocity proportional-integral-derivative controller block 341 prevents an excessive fuel oil flow rate, which would cause overheating in the reboiler 33, from being selected.

The derivative block 313 and the integral block 349 are utilized because of the use of the velocity algorithm for controllers 322, 329 and 341. If the velocity algorithms are not used, then the derivative block 313 and the integral block 349 are not needed but antireset windup feedback from low selected signal 347 will be required.

The control system illustrated in FIGS. 1 and 2 provides both feed forward and feedback control of the flow rate of the bottoms product as well as the composition of the overhead product. Feed forward control is provided by the predicted overhead product flow rate and the predicted bottoms product flow rate which are predicted in response to the measured feed flow rate to the fractionation column 10. Feedback control is provided by the comparison of the actual measured bottoms product flow rate with the predicted bottoms product flow rate. Feed forward control of the external reflux is provided by the prediction of the internal reflux required to maintain the end point temperature of the overhead product at some desired level. The prediction of the internal reflux is continuously changed until the distillation temperature of the overhead product does equal the desired distillation temperature. The control system is interactive in that both the flow rate of the external reflux to the fractionation column 10 and the flow rate of the fuel oil to the reboiler 33 are determinative of the flow rate of the bottoms product and the composition of the overhead product. Maximum energy efficiency is realized by this interactive control of the external reflux flow rate and the flow rate of the fuel oil in such a manner that the external reflux flow rate and the flow rate of the fuel oil are both minimized while meeting specifications and desired rates and still providing the least disturbing transient behavior of the product flow rates.

The invention has been described in terms of a preferred embodiment as illustrated in FIGS. 1 and 2. Specific components used in the practice of the invention as illustrated in FIG. 1 such as flow sensors 51, 62, 121 and 143; flow transducers 52, 63, 123 and 144; temperature transducers 44, 71, 77, 91 and 83; level controllers 158 and 171; pneumatic control valves 155, 128, 177 and 151; flow controllers 61 and 141; and the current to pressure transducers 114 and 136 are each well known, commercially available control components such as are described at length in Perry's Chemical Engineers' Handbook, 4th Edition, Chapter 22, McGraw-Hill.

Other components not previously specified are as follows:

| | |
|---|---|
| A/D converters 47, 57, 67, 74, 79, 86, 105 and 94 | MM53578-bit A/D converter National Semiconductor |
| Digital to analog converters 112 and 133 | AD 5598-bit D/A converter Analog Devices |

For reasons of brevity, conventional auxiliary fractionation equipment such as pumps, heat exchangers, additional measurement-control devices, etc., have not been included in the above description as they play no part in the explanation of the invention.

While the invention has been described in terms of the presently preferred embodiments, reasonable variations and modifications are possible by those skilled in the art, within the scope of the described invention and the appended claims. Variations such as using an analog computer to perform the required calculations is within the scope of the invention.

That which is claimed is:

1. Apparatus comprising:
   a fractionation column means and an associated fired reboiler means;
   first conduit means for supplying fuel to said fired reboiler means to thereby supply heat to said fractionation column means;
   second conduit means for passing into said fractionation column means a feed mixture to be separated;
   third conduit means for withdrawing a bottoms product from a lower portion of said fractionation column means;
   fourth conduit means for withdrawing an overhead vapor stream from an upper portion of said fractionation column means;
   condensing means for condensing said overhead vapor stream;
   accumulator means;
   means for passing the condensed overhead stream into said accumulator means;
   sixth conduit means for withdrawing condensate from said accumulator means and for passing a first portion of the thus withdrawn condensate into an upper portion of said fractionation column means as external reflux therefor and for passing a second portion of the thus withdrawn condensate as an overhead product stream;
   means for establishing a first signal representative of the flow rate of said fuel through said first conduit means to said reboiler means required to maintain a desired bottoms product flow rate and to maintain a desired overhead product composition;
   means for controlling the flow rate of said fuel through said first conduit means to said reboiler means in response to said first signal;
   means for establishing a second signal representative of the flow rate of said external reflux to said fractionation column means required to maintain said desired bottoms product flow rate and to maintain said desired overhead product composition; and
   means for controlling the flow rate of said external reflux to said fractionation column means in response to said second signal.

2. Apparatus in accordance with claim 1 wherein said means for establishing said first signal comprises:
   means for establishing a third signal representative of the heat required to vaporize the internal reflux, said internal reflux being defined as the reflux liquid flowing inside said fractionation column means;
   means for establishing a fourth signal representative of the heat required to raise the temperature of the portion of said feed mixture which forms said bottom product to the bottoms product temperature;
   means for establishing a fifth signal representative of the heat required to vaporize the portion of said feed mixture which forms said overhead vapor stream;
   means for summing said third signal, said fourth signal and said fifth signal to produce a sixth signal representative of the total heat required by said fractionation column means;
   means for establishing a seventh signal representative of the heat which can be supplied per unit volume of said fuel; and
   means for dividing said sixth signal by said seventh signal to produce said first signal.

3. Apparatus in accordance with claim 2 wherein said means for establishing said seventh signal comprises:
   means for establishing an eighth signal representative of the heat of combustion of said fuel;
   means for establishing a ninth signal representative of the efficiency with which said fuel can be converted to heat; and
   means for multiplying said eighth signal by said ninth signal to establish said seventh signal.

4. Apparatus in accordance with claim 3 wherein said means for establishing said third signal comprises:
   means for establishing a tenth signal representative of the flow rate of said internal reflux required to maintain said required overhead product composition;
   means for establishing an eleventh signal representative of the heat of vaporization of said internal reflux; and
   means for multiplying said tenth signal by said eleventh signal to produce said third signal.

5. Apparatus in accordance with claim 4 wherein said means for establishing said fourth signal comprises:

means for establishing a twelfth signal (B) representative of a prediction of the flow rate of said bottoms prodct;

means for establishing a thirteenth signal ($C_{PB}$) representative of the specific heat of the portion of said feed mixture which forms said bottoms product;

means for multiplying said twelfth signal and said thirteenth signal to produce a fourteenth signal representative of $(B)(C_{PB})$;

means for establishing a fifteenth signal ($T_B$) representative of the temperature of said bottoms product;

means for establishing a sixteenth signal ($T_F$) representative of the temperature of said feed mixture;

means for subtracting said sixteenth signal from said fifteenth signal to produce a seventeenth signal representative of $T_B - T_F$; and means for multiplying said seventeenth signal by said fourteenth signal to produce said fourth signal.

6. Apparatus in accordance with claim 5 wherein said means for establishing said fifth signal comprises:

means for establishing an eighteenth signal ($C_{PD}$) representative of the specific heat of the portion of said feed mixture which forms said overhead vapor stream;

means for establishing a nineteenth signal ($T_T$) representative of the temperature of said overhead vapor stream;

means for subtracting said sixteenth signal from said nineteenth signal to produce a twentieth signal representative of $T_T - T_F$;

means for multiplying said eighteenth signal by said twentieth signal to produce a twenty-first signal representative of $(C_{PD})(T_T - T_F)$;

means for establishing a twenty-second signal ($H_{VD}$) representative of the heat of vaporization of the portion of said feed mixture which forms said overhead vapor stream;

means for summing said twenty-first signal and said twenty-second signal to produce a twenty-third signal representative of $H_{VD} + (C_{PD})(T_T - T_F)$;

means for establishing a twenty-fourth signal representative of a prediction of the flow rate of said overhead vapor stream; and means for multiplying said twenty-third signal by said twenty-fourth signal to produce said fifth signal.

7. Apparatus in accordance with claim 2 wherein said means for establishing said second signal comprises:

means for establishing an eighth signal representative of a prediction of the flow rate of said internal reflux required to maintain said required overhead product composition;

means for establishing a ninth signal ($T_T$) representative of the temperature of said overhead vapor stream;

means for establishing a tenth signal ($T_R$) representative of the temperature of said external reflux;

means for subtracting said tenth signal from said ninth signal to produce an eleventh signal representative of $T_T - T_R$;

means for establishing a twelfth signal (K) representative of the specific heat of said external reflux divided by the heat of vaporization of said external reflux;

means for multiplying said twelfth signal by said eleventh signal to produce a thirteenth signal representative of $(K)(T_T - T_R)$;

means for establishing a fourteenth signal representative of the constant +1;

means for summing said thirteenth signal and said fourteenth signal to produce a fifteenth signal representative of $+1(K)(T_T - T_R)$; and means for dividing said eighth signal by said fifteenth signal to produce said second signal.

8. Apparatus in accordance with claim 1 wherein said means for establishing said first signal comprises:

means for establishing a third signal representative of the heat required to vaporize the internal reflux, said internal reflux being defined as the reflux liquid flowing inside said fractionation column means;

means for establishing a fourth signal representative of the heat required to raise the temperature of the portion of said feed mixture which forms said bottom product to the bottoms product temperature;

means for establishing a fifth signal representative of the heat required to vaporize the portion of said feed mixture which forms said overhead vapor stream;

means for summing said third signal, said fourth signal and said fifth signal to produce a sixth signal representative of the total heat required by said fractionation column means;

means for establishing a seventh signal representative of the heat of combustion of said fuel;

means for establishing an eighth signal representative of the efficiency with which said fuel can be converted to heat;

means for multiplying said seventh signal by said eighth signal to establish a ninth signal representative of the heat which can be supplied per unit volume of said fuel;

means for dividing said sixth signal by said ninth signal to produce a tenth signal representative of a prediction of the required flow rate of said fuel;

means for establishing an eleventh signal representative of a prediction of the bottoms product flow rate;

means for establishing a twelfth signal representative of the actual bottoms product flow rate;

means for comparing said eleventh signal and said twelfth signal and for producing a thirteenth signal responsive to the difference between said eleventh and said twelfth signal; and means for combining said thirteenth signal and said tenth signal to produce said first signal.

9. Apparatus in accordance with claim 8 wherein said means for establishing said third signal comprises:

means for establishing a fourteenth signal representative of the flow rate of said internal reflux required to maintain said required overhead product composition;

means for establishing a fifteenth signal representative of the heat of vaporization of said internal reflux; and means for multiplying said fourteenth signal by said fifteenth signal to produce said third signal.

10. Apparatus in accordance with claim 9 wherein said means for establishing said fourth signal comprises:

means for establishing a sixteenth signal (B) representative of a prediction of the flow rate of said bottoms product;

means for establishing a seventeenth signal ($C_{PB}$) representative of the specific heat of the portion of said feed mixture which forms said bottoms product;

means for multiplying said sixteenth signal and said seventeenth signal to produce an eighteenth signal representative of $(B)(C_{PB})$;

means for establishing a nineteenth signal ($T_B$) representative of the temperature of said bottoms product;

means for establishing a twentieth signal ($T_F$) representative of the temperature of said feed mixture;

means for subtracting said twentieth signal from said nineteenth signal to produce a twenty-first signal representative of $T_B - T_F$; and means for multiplying said twenty-first signal by said eighteenth signal to produce said fourth signal.

11. Apparatus in accordance with claim 10 wherein said means for establishing said fifth signal comprises:

means for establishing a twenty-second signal ($C_{PD}$) representative of the specific heat of the portion of said feed mixture which forms said overhead vapor stream;

means for establishing a twenty-third signal ($T_T$) representative of the temperature of said overhead vapor stream;

means for subtracting said twentieth signal from said twenty-third signal to produce a twenty-fourth signal representative of $T_T - T_F$;

means for multiplying said twenty-second signal by said twenty-fourth signal to produce a twenty-fifth signal representative of $(C_{PD})(T_T - T_F)$;

means for establishing a twenty-sixth signal ($H_{VD}$) representative of the heat of vaporization of the portion of said feed mixture which forms said overhead vapor stream;

means for summing said twenty-fifth signal and said twenty-sixth signal to produce a twenty-seventh signal representative of $H_{VD} + (C_{PD})(T_T - T_F)$;

means for establishing a twenty-eighth signal representative of a prediction of the flow rate of said overhead vapor stream; and means for multiplying said twenty-seventh signal by said twenty-eighth signal to produce said fifth signal.

12. Apparatus in accordance with claim 11 wherein said means for combining said tenth signal and said thirteenth signal comprises a summing means.

13. Apparatus in accordance with claim 8 wherein said means for establishing said second signal comprises:

establishing a fourteenth signal representative of a prediction of the flow rate of said internal reflux required to maintain said required overhead product composition;

means for establishing a fifteenth signal ($T_T$) representative of the temperature of said overhead vapor stream;

means for establishing a sixteenth signal ($T_R$) representative of the temperature of said external reflux;

means for subtracting said sixteenth signal from said fifteenth signal to produce a seventeenth signal representative of $T_T - T_R$;

means for establishing an eighteenth signal (K) representative of the specific heat of said external reflux divided by the heat of vaporization of said external reflux;

means for multiplying said eighteenth signal by said seventeenth signal to produce a nineteenth signal representative of $(K)(T_T - T_R)$;

means for establishing a twentieth signal representative of the constant +1;

means for summing said nineteenth signal and said twentieth signal to produce a twenty-first signal representative of $1 + (K)(T_T - T_R)$; and means for dividing said fourteenth signal by said twenty-first signal to produce said second signal.

14. Apparatus in accordance with claim 8 additionally comprising:

a low selector means;

means for supplying said first signal to said low selector means;

means for establishing a fourteenth signal representative of the maximum allowable flow rate of said fuel to said reboiler which will allow the desired overhead product composition to be maintained;

means for supplying said fourteenth signal to said low select means;

means for establishing a fifteenth signal representative of the maximum allowable flow rate of said fuel to said fired reboiler means which will not exceed the maximum operating temperature of said fired reboiler means; and means for supplying said fifteenth signal to said low select means, said low select means supplying the lower of said first, said fourteenth or said fifteenth signals to said means for controlling the flow rate of said fuel to said fired reboiler means.

15. A method of controlling a fractionation zone, said method comprising the steps of:

passing a fuel to a fired reboiler associated with said fractionation zone, said fuel being combusted to supply heat to said fractionation zone;

passing into said fractionation zone a feed mixture to be separated;

withdrawing a bottom product from a lower portion of said fractionation zone;

withdrawing an overhead vapor stream from an upper portion of said fractionation zone;

condensing said overhead vapor stream;

passing the condensed overhead stream into an accumulation zone;

withdrawing condensate from said accumulation zone and passing a first portion thereof into an upper portion of said fractionation zone as external reflux therefor and passing a second portion thereof as an overhead product stream;

establishing a first signal representative of the flow rate of said fuel to said fired reboiler associated with said fractionation zone required to maintain a desired bottoms product flow rate and to maintain a desired overhead product composition;

controlling the flow rate of said fuel to said fired reboiler associated with said fractionation zone in response to said first signal;

establishing a second signal representative of the flow rate of said external reflux to said fractionation zone required to maintain said desired bottoms product flow rate and to maintain said desired overhead product composition; and controlling the flow rate of said external reflux to said fractionation zone in response to said second signal.

16. A method in accordance with claim 15 wherein said step of establishing said first signal comprises:

establishing a third signal representative of the heat required to vaporize the internal reflux, said internal reflux being defined as the reflux liquid flowing inside said fractionation zone;

establishing a fourth signal representative of the heat required to raise the temperature of the portion of said feed mixture which forms said bottoms product to the bottoms product temperature;

establishing a fifth signal representative of the heat required to vaporize the portion of said feed mixture which forms said overhead vapor stream;

summing said third signal, said fourth signal and said fifth signal to produce a sixth signal representative of the total heat required by said fractionation zone;

establishing a seventh signal representative of the heat which can be supplied per unit volume of said fuel; and dividing said sixth signal by said seventh signal to produce said first signal.

17. A method in accordance with claim 16 wherein said step of establishing said seventh signal comprises:

establishing an eighth signal representative of the heat of combustion of said fuel;

establishing a ninth signal representative of the efficiency with which said fuel can be converted to heat; and multiplying said eighth signal by said ninth signal to establish said seventh signal.

18. A method in accordance with claim 17 wherein said step of establishing said third signal comprises:

establishing a tenth signal representative of the flow rate of said internal reflux required to maintain said required overhead product composition;

establishing an eleventh signal representative of the heat of vaporization of said internal reflux; and multiplying said tenth signal by said eleventh signal to produce said third signal.

19. A method in accordance with claim 18 wherein said step of establishing said fourth signal comprises:

establishing a twelfth signal (B) representative of a prediction of the flow rate of said bottoms product;

establishing a thirteenth signal ($C_{PB}$) representative of the specific heat of the portion of said feed mixture which forms said bottoms product;

multiplying said twelfth signal and said thirteenth signal to produce a fourteenth signal representative of $(B)(C_{PB})$;

establishing a fifteenth signal ($T_B$) representative of the temperature of said bottoms product;

establishing a sixteenth signal ($T_F$) representative of the temperature of said feed mixture;

subtracting said sixteenth signal from said fifteenth signal to produce a seventeenth signal representative of $T_B - T_F$; and multiplying said seventeenth signal by said fourteenth signal to produce said fourth signal.

20. A method in accordance with claim 19 wherein said step of establishing said fifth signal comprises:

establishing an eighteenth signal ($C_{PD}$) representative of the specific heat of the portion of said feed mixture which forms said overhead vapor stream;

establishing a nineteenth signal ($T_T$) representative of the temperature of said overhead vapor stream;

subtracting said sixteenth signal from said nineteenth signal to produce a twentieth signal representative of $T_T - T_F$;

multiplying said eighteenth signal by said twentieth signal to produce a twenty-first signal representative of $(C_{PD})(T_T - T_F)$;

establishing a twenty-second signal ($H_{VD}$) representative of the heat of vaporization of the portion of said feed mixture which forms said overhead vapor stream;

summing said twenty-first signal and said twenty-second signal to produce a twenty-third signal representative of $H_{VD} + (C_{PD})(T_T - T_F)$;

establishing a twenty-fourth signal representative of a prediction of the flow rate of the overhead vapor stream; and multiplying said twenty-third signal by said twenty-fourth signal to produce said fifth signal.

21. A method in accordance with claim 16 wherein said step of establishing said second signal comprises:

establishing an eighth signal representative of a prediction of the flow rate of said internal reflux required to maintain said required overhead product composition;

establishing a ninth signal ($T_T$) representative of the temperature of said overhead vapor stream;

establishing a tenth signal ($T_R$) representative of the temperature of said external reflux;

subtracting said tenth signal from said ninth signal to produce an eleventh signal representative of $T_T - T_R$;

establishing a twelfth signal (K) representative of the specific heat of said external reflux divided by the heat of vaporization of said external reflux;

multiplying said twelfth signal by said eleventh signal to produce a thirteenth signal representative of $(K)(T_T - T_R)$;

establishing a fourteenth signal representative of the constant $+1$;

summing said thirteenth signal and said fourteenth signal to produce a fifteenth signal representative of $1 + (K)(T_T - T_R)$; and dividing said eighth signal by said fifteenth signal to produce said second signal.

22. A method in accordance with claim 15 wherein said step of establishing said first signal comprises:

establishing a third signal representative of the heat required to vaporize the internal reflux, said internal reflux being defined as the reflux liquid flowing inside said fractionation zone;

establishing a fourth signal representative of the heat required to raise the temperature of the portion of said feed mixture which forms said bottom product to the bottoms product temperature;

establishing a fifth signal representative of the heat required to vaporize the portion of said feed mixture which forms said overhead vapor stream;

summing said third signal, said fourth signal and said fifth signal to produce a sixth signal representative of the total heat required by said fractionation zone;

establishing a seventh signal representative of the heat of combustion of said fuel;

establishing an eighth signal representative of the efficiency with which said fuel can be converted to heat;

multiplying said seventh signal by said eighth signal to establish a ninth signal representative of the heat which can be supplied per unit volume of said fuel;

dividing said sixth signal by said ninth signal to produce a tenth signal representative of a prediction of the required flow rate of said fuel;

establishing an eleventh signal representative of a prediction of the bottoms product flow rate;

establishing a twelfth signal representative of the actual bottoms product flow rate;

comparing said eleventh signal and said twelfth signal and for producing a thirteenth signal responsive to the difference between said eleventh and said twelfth signal; and combining said thirteenth signal and said tenth signal to produce said first signal.

23. A method in accordance with claim 22 wherein said step of establishing said third signal comprises:

establishing a fourteenth signal representative of the flow rate of said internal reflux required to maintain said required overhead product composition;

establishing a fifteenth signal representative of the heat of vaporization of said internal reflux; and multiplying said fourteenth signal by said fifteenth signal to produce said third signal.

24. A method in accordance with claim 23 wherein said step of establishing said fourth signal comprises:

establishing a sixteenth signal (B) representative of a prediction of the flow rate of said bottoms product;

establishing a seventeenth signal ($C_{PB}$) representative of the specific heat of the portion of said feed mixture which forms said bottoms product;

multiplying said sixteenth signal and said seventeenth signal to produce a eighteenth signal representative of $(B)(C_{PB})$;

establishing a nineteenth signal ($T_B$) representative of the temperature of said bottoms product;

establishing a twentieth signal ($T_F$) representative of the temperature of said feed mixture;

subtracting said twentieth signal from said nineteenth signal to produce a twenty-first signal representative of $T_B - T_F$; and multiplying said twenty-first signal by said eighteenth signal to produce said fourth signal.

25. A method in accordance with claim 24 wherein said step of establishing said fifth signal comprises:

establishing a twenty-second signal ($C_{PD}$) representative of the specific heat of the portion of said feed mixture which forms said overhead vapor stream;

establishing a twenty-third signal ($T_T$) representative of the temperature of said overhead vapor stream;

subtracting said twentieth signal from said twenty-third signal to produce a twenty-fourth signal representative of $T_T - T_F$;

multiplying said twenty-second signal by said twenty-fourth signal to produce a twenty-fifth signal representative of $(C_{PD})(T_T - T_F)$;

establishing a twenty-sixth signal ($H_{VD}$) representative of the heat of vaporization of the portion of said feed mixture which forms said overhead vapor stream;

summing said twenty-fifth signal and said twenty-sixth signal to produce a twenty-seventh signal representative of $H_{VD} + (C_{PD})(T_T - T_F)$;

establishing a twenty-eighth signal representative of a prediction of the flow rate of said overhead vapor stream; and multiplying said twenty-seventh signal by said twenty-eighth signal to produce said fifth signal.

26. A method in accordance with claim 25 wherein said step of combining said tenth signal and said thirteenth signal comprises summing said tenth signal and said thirteenth signal.

27. A method in accordance with claim 22 wherein said step of establishing said second signal comprises:

establishing a fourteenth signal representative of a prediction of the flow rate of said internal reflux required to maintain said required overhead product composition;

establishing a fifteenth signal ($T_T$) representative of the temperature of said overhead vapor stream;

establishing a sixteenth signal ($T_R$) representative of the temperature of said external reflux;

subtracting said sixteenth signal from said fifteenth signal to produce a seventeenth signal representative of $T_T - T_R$;

establishing an eighteenth signal (K) representative of the specific heat of said external reflux divided by the heat of vaporization of said external reflux;

multiplying said eighteenth signal by said seventeenth signal to produce a nineteenth signal representative of $(K)(T_T - T_R)$;

establishing a twentieth signal representative of the constant $+1$;

summing said nineteenth signal and said twentieth signal to produce a twenty-first signal representative of $1 + (K)(T_T - T_R)$; and dividing said fourteenth signal by said twenty-first signal to produce said second signal.

28. A method in accordance with claim 22 comprising the additional steps of:

establishing a fourteenth signal representative of the maximum allowable flow rate of said fuel to said fired reboiler which will allow the required overhead product composition to be maintained;

establishing a fifteenth signal representative of the maximum allowable flow rate of said fuel to said fired reboiler which will not exceed the maximum operating temperature of said fired reboiler; and controlling the flow rate of said fuel to said fired reboiler in response to the lower of said first, said fourteenth or said fifteenth signals.

* * * * *

UNITED STATES PATENT AND TRADEMARK OFFICE
CERTIFICATE OF CORRECTION

PATENT NO. : 4,166,770
DATED : September 4, 1979
INVENTOR(S) : John E. Anderson et al It is certified that error appears in the above-identified patent and that said Letters Patent are hereby corrected as shown below:

Column 1, line 65, after "inclusion of", insert --- an ---.

Column 7, lines 1 and 2, delete "current pressure" and insert --- current-to-pressure.

Column 8, line 67, delete the equation in its entirety and insert --- $Q_3 = (D)[H_{VD} + C_{PD}(T_T - T_F)]$ ---.

Column 15, claim 5, line 5, " prodct" should be --- product ---.

Column 16, claim 7, line 8, in the formula, delete the "+" before the 1 and insert --- + --- after the "1".

Signed and Sealed this

Twenty-sixth Day of February 1980

[SEAL]

Attest:

SIDNEY A. DIAMOND

Attesting Officer

Commissioner of Patents and Trademarks